(12) United States Patent
Dateki

(10) Patent No.: US 9,467,980 B2
(45) Date of Patent: Oct. 11, 2016

(54) MOBILE COMMUNICATION SYSTEM, BASE STATION APPARATUS, AND COMMUNICATION CONTROL METHOD

(71) Applicant: FUJITSU LIMITED, Kawasaki-shi, Kanagawa (JP)

(72) Inventor: Takashi Dateki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 517 days.

(21) Appl. No.: 13/925,274

(22) Filed: Jun. 24, 2013

(65) Prior Publication Data

US 2013/0286972 A1 Oct. 31, 2013

Related U.S. Application Data

(63) Continuation of application No. PCT/JP2011/050576, filed on Jan. 14, 2011.

(51) Int. Cl.
H04W 72/04 (2009.01)
H04W 16/28 (2009.01)

(52) U.S. Cl.
CPC ......... *H04W 72/0406* (2013.01); *H04W 16/28* (2013.01)

(58) Field of Classification Search
None
See application file for complete search history.

(56) References Cited

U.S. PATENT DOCUMENTS

| | | | | |
|---|---|---|---|---|
| 8,204,142 B2 * | 6/2012 | Hwang | ................ | H04B 7/0452 375/267 |
| 8,320,432 B1 * | 11/2012 | Chockalingam | ..... | H04B 7/0452 375/219 |
| 8,369,438 B2 * | 2/2013 | Lee | ................ | H04L 25/03191 375/267 |
| 8,625,688 B2 * | 1/2014 | Yeh | ................ | H04B 7/0452 375/260 |
| 2007/0183380 A1 | 8/2007 | Rensburg et al. | | |
| 2008/0008110 A1 | 1/2008 | Kishigami et al. | | |
| 2008/0285524 A1 | 11/2008 | Yokoyama | | |
| 2009/0103486 A1 | 4/2009 | Hunukumbure et al. | | |

(Continued)

FOREIGN PATENT DOCUMENTS

| | | |
|---|---|---|
| JP | 2006-5908 | 1/2006 |
| JP | 2007-208719 | 8/2007 |

(Continued)

OTHER PUBLICATIONS

Notice of Rejection issued for corresponding Japanese Patent Application No. 2012-552614, mailed on May 7, 2014, with an English translation.

(Continued)

*Primary Examiner* — Anh Ngoc Nguyen
*Assistant Examiner* — Adam Duda
(74) *Attorney, Agent, or Firm* — Myers Wolin, LLC

(57) ABSTRACT

A mobile communication system includes one or more base station apparatuses and a plurality of mobile station apparatuses that communicate with the one or more base station apparatuses. A precoding determining unit of the mobile station apparatuses determines applied precoding to be applied to a transmission signal from the base station apparatuses to the corresponding apparatus. A first transmitting unit of the mobile station apparatuses transmits information of the applied precoding to the base station apparatuses. A second transmitting unit of the base station apparatuses applies the same precoding and transmits a transmission signal to a plurality of mobile station apparatuses that specify the same precoding as the applied precoding.

7 Claims, 9 Drawing Sheets

(56) References Cited

U.S. PATENT DOCUMENTS

| | | | |
|---|---|---|---|
| 2010/0061479 A1* | 3/2010 | Mazet | H04L 27/3488 375/295 |
| 2010/0284351 A1 | 11/2010 | Liang et al. | |
| 2010/0323624 A1 | 12/2010 | Narayan et al. | |
| 2010/0323625 A1 | 12/2010 | Kishigami et al. | |
| 2011/0206154 A1* | 8/2011 | Ding | H04B 7/024 375/267 |
| 2012/0014473 A1* | 1/2012 | Heath, Jr. | H04L 25/03961 375/295 |
| 2012/0170675 A1 | 7/2012 | Li et al. | |

FOREIGN PATENT DOCUMENTS

| | | |
|---|---|---|
| JP | 2009-105893 | 5/2009 |
| JP | 2009-526466 A | 7/2009 |
| JP | 2009-213134 | 9/2009 |
| JP | 2010-537599 A | 12/2010 |
| WO | 2007/091317 | 8/2007 |
| WO | 2009/098880 | 8/2009 |
| WO | 2010/061724 | 6/2010 |
| WO | 2011/020238 A1 | 2/2011 |

OTHER PUBLICATIONS

International search report issued for corresponding International Patent Application No. PCT/JP2011/050576, mailed Mar. 22, 2011, with English translation.

ETRI; "UE feedback for downlink CoMP"; Agenda Item: 7.5; 3GPP TSG RAN WG1 Meeting #58bis; R1-094314; Miyazaki, Japan; Oct. 12-16, 2009.

Mediatek Inc.; "Phase Adjustment Mechanism in CoMP"; Agenda Item: 7.5; 3GPP TSG RAN WG1 Meeting #59; R1-094771; Jeju, Korea; Nov. 9-13, 2009.

"New Automatic Equaliser Employing Modulo Arithmetic"; Electronics Letters; Mar. 25, 1971; vol. 7, Nos. 5/6.

Harashima et al.; "Matched-Transmission Technique for Channels With Intersymbol Interference"; IEEE Transactions on Communications; Aug. 1972; vol. COM-20, No. 4.

Hochwald et al.; "A Vector-Perturbation Technique for Near-Capacity Multiantenna Multiuser Communication—Part II: Perturbation"; IEEE Transactions on Communications; Mar. 2005; vol. 53, No. 3.

Extended European search report with the supplementary European search report and the European search opinion issued for corresponding European Patent Application No. 11855548.1 mailed on Jul. 1, 2016.

Yao et al., "A Transceiver Design Based on Uniform Channel Decomposition and MBER Vector Perturbation", IEEE Transactions on Vehicular Technology, vol. 59, No. 6, pp. 3153-3159, Jul. 2010.

Freescale Semiconductor, Inc., "Codebook Design for MU-MIMO", Agenda Item: 510.2, 3GPP TSG RAN WG1 #49bis, R1-072810, 3rd Generation Partnership Project (3GPP), Orlando, FL (US), Jun. 2007.

\* cited by examiner

| INDEX | PRECODING VECTOR: $W_i$ |
|---|---|
| 1 | P(1) |
| 2 | P(2) |
| 3 | P(3) |
| 4 | P(4) |
| ⋮ | ⋮ |
| k | P(k) |

FIG.11

| INDEX | NUMBER OF ANTENNAS 1 PRECODING VECTOR: $W_i(1)$ | NUMBER OF ANTENNAS 2 PRECODING VECTOR: $W_i(2)$ | NUMBER OF ANTENNAS 4 PRECODING VECTOR: $W_i(3)$ |
|---|---|---|---|
| 1 | P1(1) | P2(1) | P4(1) |
| 2 | P1(2) | P2(2) | P4(2) |
| 3 | P1(3) | P2(3) | P4(3) |
| 4 | P1(4) | P2(4) | P4(4) |
| ... | ... | ... | ... |
| k | P1(k) | P2(k) | P4(k) |

MOBILE COMMUNICATION SYSTEM, BASE STATION APPARATUS, AND COMMUNICATION CONTROL METHOD

CROSS-REFERENCE TO RELATED APPLICATIONS

This application is a continuation application of International Application PCT/JP2011/050576 filed Jan. 14, 2011 and designating the U.S., the entire contents of which are incorporated herein by reference.

FIELD

The present invention relates to a mobile communication system, a base station apparatus, and a communication control method.

BACKGROUND

It has been strongly desired to enhance throughput and improve receiving quality in wireless communications in recent years. To meet this desire, there has been developed a technology of cooperative communications for transmitting data from a plurality of base station apparatuses to a plurality of mobile station apparatuses. Examples of cooperative communications include a technology of multi-input multi-output (MIMO) and a technology of beam forming.

For cooperative communications, there have been developed technologies of precoding and a vector perturbation technique (VPT). Precoding is a technology for improving receiving quality of a receiver, such as a mobile station apparatus, by causing a transmitter, such as a base station apparatus, to add different phases to a certain transmission signal and transmit the signal from a plurality of antennas, for example. Specifically, precoding is carried out by a transmitter adding different phases to a certain transmission signal and transmitting the signal from a plurality of antennas. The VPT is a technology for performing signal processing on a signal to be transmitted in the case where a transmitter is informed of an interference signal multiplexed on a signal to be received by a receiver in advance. The signal processing reduces influence of the interference signal on the receiver.

The VPT is a technology for reducing, when a transmitter transmits a plurality of signals, interference of the signals in a receiver by the transmitter adding specific deviation to the transmission signals and transmitting the signals.

There has also been developed a conventional technology for eliminating interference in advance by a certain mobile station apparatus feeding back an interference elimination coefficient so as to prevent another receiving station from interfering with the receiving station.

Patent Literature 1: Japanese Laid-open Patent Publication No. 2009-213134
Patent Literature 2: Japanese Laid-open Patent Publication No. 2009-105893
Patent Literature 3: International Publication Pamphlet No. WO 2007/091317
Patent Literature 4: Japanese Laid-open Patent Publication No. 2007-208719
Patent Literature 5: Japanese Laid-open Patent Publication No. 2006-5908
Non Patent Literature 1: H. Harashima and H. Miyakawa, "Matched-transmission technique for channels with inter-symbol interference," IEEE Trans. Commun., vol. 20, pp. 774-780, August 1972.
Non Patent Literature 2: M. Tomlinson, "New automatic equalizer employing modulo arithmetic," Electron. Lett., pp. 138-139, March 1971.
Non Patent Literature 3: B. M. Hochwald, C. B. Peel, and A. Lee Swindlehurst, "A vector-perturbation technique for near-capacity multiantenna multiuser communication-Part II: perturbation," IEEE Trans. Commun., vol. 53, pp. 537-544, March 2005.

SUMMARY

The technologies of precoding and the VPT are based on the assumption that the base station apparatus grasps the status of a transmission route besides data to be transmitted. For this reason, the mobile station apparatus acquires the status of the transmission route based on received signals and feeds back the status of the transmission route thus acquired to the base station apparatus. In this regard, to transmit an accurate status of the transmission route, a method for feeding back the status of the transmission route simply grasped by the mobile station apparatus to the base station apparatus increases the amount of information to be fed back. As a result, consumption of wireless resource for a feedback link increases.

In the conventional technology for eliminating interference in advance, the mobile station apparatuses each receive a signal to which desired precoding is applied. As a result, each mobile station apparatus feeds back information of precoding applied to a signal for the corresponding apparatus and precoding applied to a signal for another mobile station apparatus. In this case, the information to be fed back further increases, thereby increasing the consumption of the wireless resource. Furthermore, to establish communications using a number of base station apparatuses in the conventional technology, precoding to be applied in the respective base station apparatuses is fed back thereto. As a result, the amount of information to be fed back increases depending on the number of base station apparatuses, thereby increasing the consumption of the wireless resource.

A mobile communication system includes: one or more base station apparatuses; and a plurality of mobile station apparatuses that communicate with the one or more base station apparatuses, wherein the mobile station apparatuses each includes: a precoding determining unit that determines applied precoding to be applied to a transmission signal from the base station apparatuses to the corresponding mobile station apparatus; and a first transmitting unit that transmits information of the applied precoding to the base station apparatuses, and the base station apparatuses each includes a second transmitting unit that applies same precoding and transmits a transmission signal to a plurality of mobile station apparatuses that specify the same precoding as the applied precoding.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is an exemplary schematic of a table of precoding vectors in a second embodiment.

DESCRIPTION OF EMBODIMENT

Embodiments of a mobile communication system, a base station apparatus, and a communication control method disclosed in the present application are described below in greater detail with reference to the drawings. The embodiments are not intended to limit the technology disclosed in the present application.

First Embodiment

Figure 1:
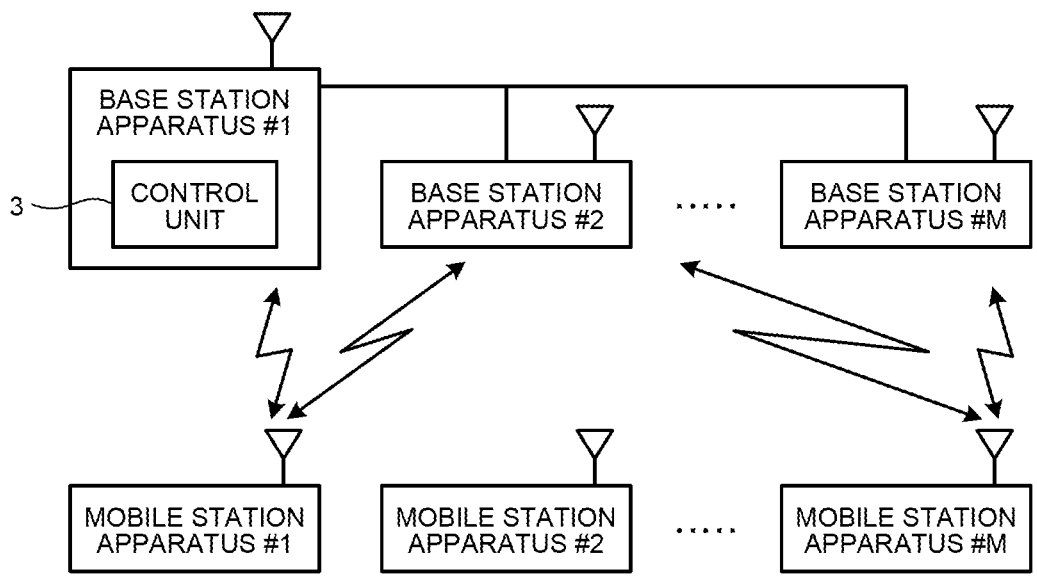
FIG. 1 is a schematic of a system of a mobile communication system according to a first embodiment.

FIG. 1 is a schematic of a system of a mobile communication system according to a first embodiment. As illustrated in FIG. 1, the mobile communication system according to the present embodiment includes a plurality of base station apparatuses #1 to #M and a plurality of mobile station apparatuses #1 to #M. While the number of base station apparatuses and the number of mobile station apparatuses are the same in the present embodiment, the numbers are not particularly restricted. The base station apparatus #1 according to the present embodiment includes a control unit 3. The control unit 3 corresponds to an example of a "control device".

Figure 2:
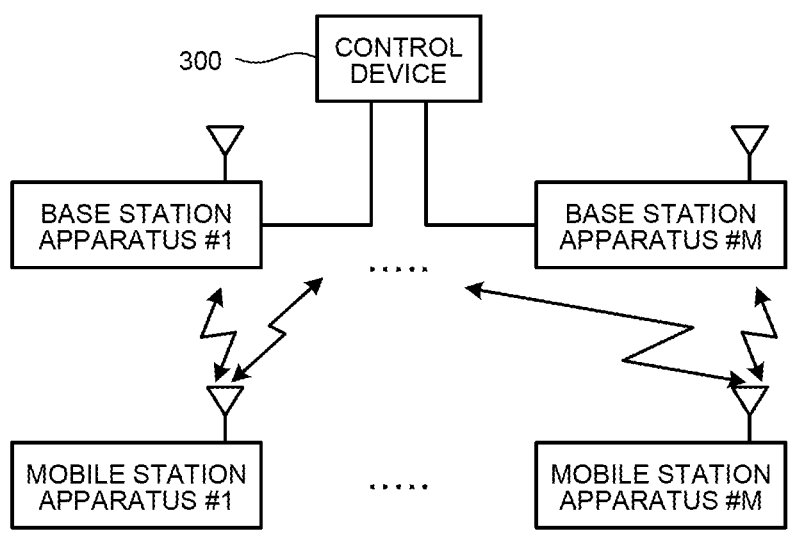
FIG. 2 is a schematic of a system illustrating another example of the mobile communication system according to the first embodiment.

An explanation will be made of the case where the control unit 3 is provided to the base station apparatus #1 in the present embodiment for convenience of the explanation. In an actual configuration, the control unit 3 may be provided to any one of the base station apparatus #1 to the base station apparatus #M. FIG. 2 is a schematic of a system illustrating another example of the mobile communication system according to the first embodiment. While the control device is provided inside of the base station apparatus #1 in the present embodiment as illustrated in FIG. 1, the control device may be provided separately from the base station apparatus #1 as a control device 300 like the communication system illustrated in FIG. 2.

In the description below, the base station apparatus #1 to the base station apparatus #M are simply denoted as a "base station apparatus #j" if there is no need to distinguish them. In this case, j represents an arbitrary number among 1 to M. The mobile station apparatus #1 to the mobile station apparatus #M are simply denoted as a "mobile station apparatus #i" if there is no need to distinguish them. In this case, i represents an arbitrary number among 1 to M.

As illustrated in FIG. 1, each base station apparatus #j transmits and receives data to and from each mobile station apparatus #i via wireless communications. The base station apparatus #1 is connected to the base station apparatus #2 to the base station apparatus #M via a network. The base station apparatus #1 transmits and receives data to and from the base station apparatus #2 to the base station apparatus #M via the network.

(Mobile Station Apparatus)

Figure 3:
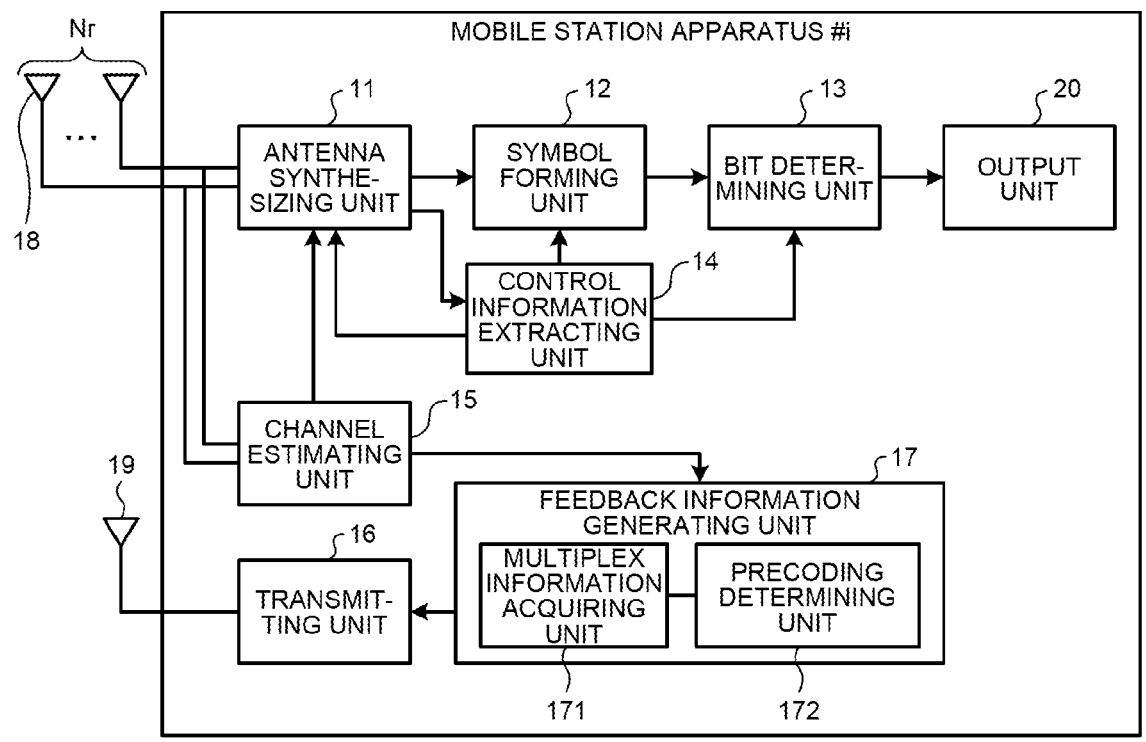
FIG. 3 is a block diagram of a mobile station apparatus according to the first embodiment.

The mobile station apparatus #i will now be described. FIG. 3 is a block diagram of the mobile station apparatus #i according to the first embodiment. As illustrated in FIG. 3, the mobile station apparatus #i includes an antenna synthesizing unit 11, a symbol forming unit 12, a bit determining unit 13, a control information extracting unit 14, a channel estimating unit 15, a transmitting unit 16, a feedback information generating unit 17, a receiving antenna 18, a transmitting antenna 19, and an output unit 20.

Figure 4:
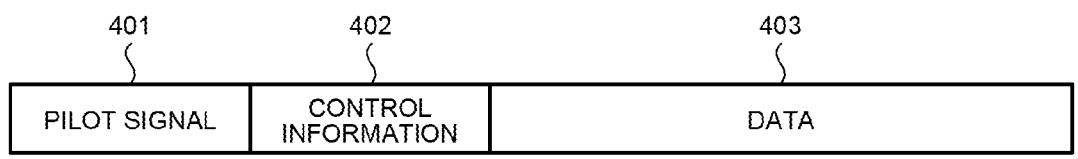
FIG. 4 is an exemplary schematic of a format of a signal transmitted by a base station apparatus 1.

The mobile station apparatus #i includes Nr receiving antennas 18. Nr may be any value as long as it is a natural number and may be 1, 2, or 4, for example. The receiving antenna 18 receives a signal from the base station apparatus #j. FIG. 4 is an exemplary schematic of a format of the signal transmitted by the base station apparatus #j. As illustrated in FIG. 4, the signal received by the mobile station apparatus #i from the base station apparatus #j includes a pilot signal 401, control information 402, and data 403. The pilot signal 401 is a known signal used for estimating a change in a phase and amplitude of a signal transmitted from any one of antennas 26 of the base station apparatus #j, which will be described later, due to a transmission route from the base station apparatus #j to the mobile station apparatus #i. The pilot signal 401 is transmitted from each antenna in a manner capable of separating the antenna from other antennas. The antennas 26 of the base station apparatus #j may transmit the pilot by time-division multiplexing, for example. The control information 402 is information used for performing control in signal processing. The control information 402 contains a modulation method, precoding information, and channel quality information (CQI), for example. Examples of the modulation method may include quadrature phase shift keying (QPSK), 16 quadrature amplitude modulation (QAM), and 64 QAM. The data 403 is information to be substantially transmitted. In the present embodiment, a precoding index is used as the precoding information. The precoding index is identification information used for identifying an applied precoding vector.

The control information extracting unit 14 acquires a signal received by the receiving antenna 18 from each base station apparatus #j. The control information extracting unit 14 then extracts the control information 402 (refer to FIG. 4) from the signal thus acquired. The control information extracting unit 14 acquires a precoding index from the control information 402 and notifies the antenna synthesizing unit 11 of the precoding index thus acquired. The control information extracting unit 14 also acquires a modulation method from the control information 402 and notifies the bit determining unit 13 of the modulation method thus acquired.

The channel estimating unit 15 acquires a signal received by the receiving antenna 18 from each base station apparatus #j. The channel estimating unit 15 acquires the pilot signal

401 (refer to FIG. 4) included in the signal thus acquired. The channel estimating unit 15 uses the pilot signal 401 thus acquired to estimate a transmission route coefficient from each base station apparatus #j. In the present embodiment, the channel estimating unit 15 derives the transmission route coefficient as $H_{ij}$ (1≤i, j≤M), which is an Nr×Nt matrix. Nt represents the number of antennas of the base station apparatus #j, which will be described later. $H_{ij}$ represents a channel matrix indicating phase amplitude change due to the transmission route from the base station apparatus #j to the mobile station apparatus #i.

The channel estimation carried out by the channel estimating unit 15 will now be described. There have been developed a lot of technologies for estimating a channel using the pilot signal 401. Particularly to carry out high-speed transmission, such as MIMO, a sufficient amount of wireless resource is allocated to transmission of the pilot signal. This makes it possible to estimate the channel with high accuracy. Thus, the channel estimating unit 15 may use any one of the conventionally known technologies for estimating a channel among methods for estimating the channel with accuracy used for the mobile communication system.

The channel estimating unit 15 outputs the channel matrix $H_{ij}$ serving as the transmission route coefficient corresponding to the base station apparatus #j to the antenna synthesizing unit 11 and the feedback information generating unit 17.

The antenna synthesizing unit 11 acquires a signal received by the receiving antenna 18 from each base station apparatus #j. The antenna synthesizing unit 11 is notified, from the control information extracting unit 14, of the precoding index included in the signal transmitted from each base station apparatus #j. The antenna synthesizing unit 11 receives the channel matrix $H_{ij}$ from the channel estimating unit 15.

Figures 5, 6:
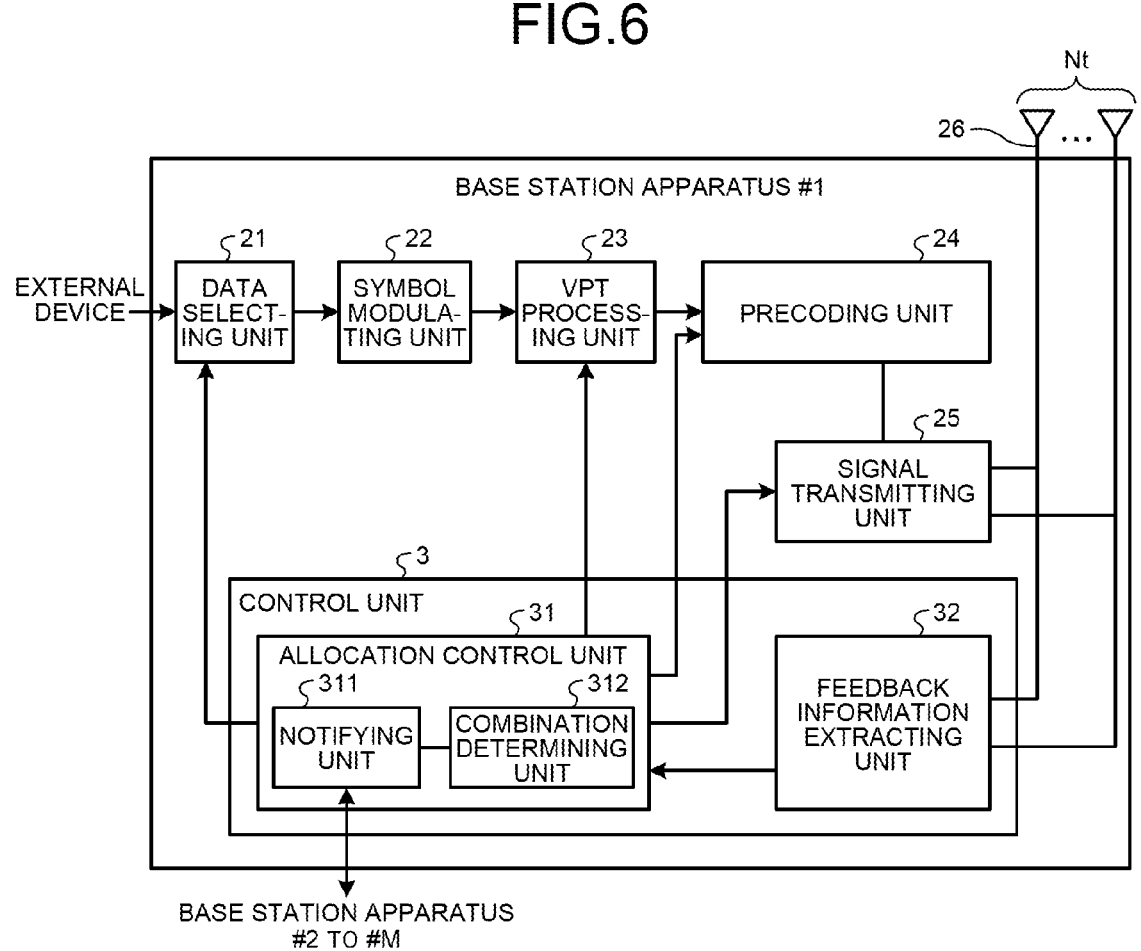
FIG. 5 is an exemplary schematic of a table of precoding vectors.
FIG. 6 is a block diagram of a base station apparatus #1 according to the present embodiment.

The antenna synthesizing unit 11 stores therein a table of precoding vectors illustrated in FIG. 5. FIG. 5 is an exemplary schematic of the table of precoding vectors. The antenna synthesizing unit 11 acquires a precoding vector corresponding to the precoding index thus received from the table of precoding vectors illustrated in FIG. 5. If the precoding index is 3, for example, the antenna synthesizing unit 11 acquires P(3) as the precoding vector.

The antenna synthesizing unit 11 uses the channel matrix $H_{ij}$ and the precoding information for the signal transmitted from each base station apparatus #j, thereby synthesizing a received signal.

The synthesis of the received signal carried out by the antenna synthesizing unit 11 will now be specifically described. The explanation will be made using the mobile station apparatus #i as an example.

Assuming that the signal transmitted by the base station apparatus #j is $x_j$, the received signal of the mobile station apparatus #i from the base station apparatus #j via the cooperative communications is expressed by Equation 1:

$$y_i = \sum_{j=1}^{M} H_{ij} W_j x_j + z_i \qquad (1)$$

As described above, $H_{ij}$ represents the Nr×Nt matrix. $z_i$ represents background noise included in the received signal of the mobile station apparatus #i. $W_j$ represents a precoding vector used for application of precoding in the base station apparatus #j.

In the case where the mobile station apparatus #i receives the signal with a synthesis coefficient that maximizes signal power from the base station apparatus #j, the antenna synthesizing unit 11 performs reception processing by maximal-ratio combining expressed by Equation 2. $W_i^+$ represents a conjugate transposed matrix of $W_i$, and $H_{ii}^+$ represents a conjugate transposed matrix of $H_{ii}$.

$$\tilde{y}_i \equiv W_i^+ H_{ii}^+ y_i \qquad (2)$$

$$= \sum_{j=1}^{M} W_i^+ H_{ii}^+ H_{ij} W_j x_j + W_i^+ H_{ii}^+ z_i$$

The antenna synthesizing unit 11 carries out normalization such that the coefficient of $x_i$ is 1 in Equation 2. The normalization is expressed by Equation 3:

$$\eta_i \equiv \frac{1}{W_i^+ H_{ii}^+ H_{ii} W_i} \tilde{y}_i \qquad (3)$$

$$= \sum_{j=1}^{M} \frac{W_i^+ H_{ii}^+ H_{ij} W_j}{W_i^+ H_{ii}^+ H_{ii} W_i} x_j + \frac{W_i^+ H_{ii}^+ z_i}{W_i^+ H_{ii}^+ H_{ii} W_i} = \sum_{j=1}^{M} B_{ij} x_j + \tilde{z}_i$$

$$B_{ij} = \frac{W_i^+ H_{ii}^+ H_{ij} W_j}{W_i^+ H_{ii}^+ H_{ii} W_i}$$

The mobile station apparatus #i receives a signal generated actually based on feedback information transmitted from the corresponding apparatus, which will be described later, and expressed by Equation 4 from the base station apparatus #j. u represents a vector composed of a transmission symbol $u_i$ generated by modulation carried out by a symbol modulating unit 22 of the base station apparatus #j, which will be described later. v represents an error signal vector derived by a VPT processing unit 23 of the base station apparatus #j, which will be described later. The error signal vector will be described later in detail.

$$x = B^{-1}(u+v) \qquad (4)$$

Substituting the transmission signal expressed by Equation 4 in $x_j$ of Equation 3 derives Equation 5. $v_i$ represents each component of the error signal vector derived by the VPT processing unit 23 of the base station apparatus #j.

$$\eta_i = \sum_{j=1}^{M} B_{ij} x_j + \tilde{z}_i = u_i + v_i + \tilde{z}_i \qquad (5)$$

In other words, the antenna synthesizing unit 11 performs maximal-ratio combining on the received signal and performs normalization with received-signal power, thereby providing a signal expressed by Equation 5. The antenna synthesizing unit 11 then outputs the processing result of the signal (specifically, the value expressed by Equation 5) to the symbol forming unit 12.

The symbol forming unit 12 stores therein a function f(x) that removes components of an integral multiple of X. X represents a parameter set in advance for each modulation method. The function f(x) will now be described in detail.

Z and z each represent a complex N-component vector. X represents a real parameter. d(x) represents an integer satisfying d(x)≤x<d(x)+1. x represents an arbitrary real number.

A function Z=f(x) is defined by Equation 6.

$$Z_i = f(z_i) = X\left(\left(\frac{\operatorname{Re} z_i}{X} - d\left(\frac{\operatorname{Re} z_i}{X} + 0.5\right)\right) + j\left(\frac{\operatorname{Im} z_i}{X} - d\left(\frac{\operatorname{Im} z_i}{X} + 0.5\right)\right)\right) \quad (6)$$

The function f(x) has the following characteristics.

The function f(x) is expressed by f(x)=x where the real number x satisfies −X/2≤x<X/2.

An arbitrary real number y can be expressed by y=x+nX with the real number x satisfying −X/2≤x<X/2 and an integer n. Thus, the function f(x) is expressed by f(y)=f(x+nX)=x. Furthermore, the function f(x) can be expressed by f(f(y))=f(x)=x. In other words, the function f(x) is expressed by f(f(y))=f(y) with the arbitrary real number y.

Furthermore, the function f(x) is expressed by f(y+nX)=f(y). This means that the function f(x) does not change even if an offset of an integral multiple of X is added to an arbitrary argument y. In other words, the function f(x) is a function that removes components of an integral multiple of X.

Furthermore, assuming that y1 and y2 are two real numbers, y1=x+nX=f(y1)+n1X is satisfied. In this case, the function f(x) is expressed by f(y1+y2)=f(f(y1)+n1X+y2)=f(f(y1)+y2).

The symbol forming unit 12 receives the value expressed by Equation 5 from the antenna synthesizing unit 11. The symbol forming unit 12 uses the function f(x) stored therein for Equation 5, thereby removing components of an integral multiple of X on a signal as expressed by Equation 7:

$$f(\eta_i)=f(u_i+v_i+z_i)=f(u_i+z_i) \quad (7)$$

If background noise is small, Equation 7 can be expressed by Equation 8. The signal expressed by Equation 8 is a signal obtained by adding background noise alone to the transmission symbol $u_i$ received by the mobile station apparatus #i.

$$f(\eta_i)=u_i+z_i \quad (8)$$

Thus, the symbol forming unit 12 can acquire data unaffected by another signal transmitted from each base station apparatus #j in the cooperative communications.

The symbol forming unit 12 outputs the data thus acquired to the bit determining unit 13.

The bit determining unit 13 receives the modulation method from the control information extracting unit 14. The bit determining unit 13 receives the data from the symbol forming unit 12. The bit determining unit 13 uses the modulation method received from the control information extracting unit 14 to determine a transmission bit in the data thus received. The bit determining unit 13 transmits the data determined to be the transmission bit to the output unit 20.

The output unit 20 outputs the data received from the bit determining unit 13. The output unit 20 displays the data on a display screen (not illustrated), for example.

The feedback information generating unit 17 includes a multiplex information acquiring unit 171 and a precoding determining unit 172 as illustrated in FIG. 3.

The precoding determining unit 172 receives the channel matrix $H_{ij}$ from the channel estimating unit 15.

The precoding determining unit 172 determines a precoding vector to be applied to transmission signals to the corresponding apparatus such that all the base station apparatuses #j that transmit data to the apparatus via the cooperative communications apply the same precoding vector.

An explanation will be made in detail of the determination of the precoding vector to be applied to the transmission signals to the corresponding apparatus made by the precoding determining unit 172. In Equation 3, the precoding determining unit 172 defines $B_{ij}$ as in Equation 9. This is derived by replacing a precoding vector $W_j$ used in the base station apparatus #j by a precoding vector $W_i$ used in the base station apparatus #i in $B_{ij}$. In other words, the signal expressed by Equation 3 with $B_{ij}$ of Equation 9 is a signal provided in the case where the precoding vector $W_i$ is applied in all the base stations.

$$B_{ij} = \frac{W_i^+ H_{ii}^+ H_{ij} W_i}{W_i^+ H_{ii}^+ H_{ii} W_i} \quad (9)$$

The precoding determining unit 172 uses Equation 8 to derive a precoding vector to be applied to the transmission signals to the corresponding apparatus (which may be referred to as a "precoding vector desired to be applied"). In the present embodiment, the precoding determining unit 172 determines a precoding vector that maximizes received-signal power from the base station apparatus #j to be the precoding vector desired to be applied to the apparatus. Specifically, the precoding determining unit 172 determines $V_i$ satisfying Equation 10 to be the precoding vector. $V_i$ in Equation 10 indicates $W_i$ that maximizes $W_i^+ H_{ii}^+ H_{ij} W_i$. $W_i^+ H_{ii}^+ H_{ij} W_i$ is received-signal power from the base station apparatus #j. In other words, $V_i$ is the precoding vector that maximizes received-signal power from the base station apparatus #j.

$$V_i = arg \max_{W_i \in \{P_1, P_2, ..., P_k\}} (W_i^+ H_{ii}^+ H_{ii} W_i) \quad (10)$$

The precoding determining unit 172 outputs the precoding vector thus determined to the multiplex information acquiring unit 171.

The multiplex information acquiring unit 171 receives the precoding vector $V_i$ determined by the precoding determining unit 172 from the precoding determining unit 172 as the precoding vector to be applied to the transmission signals to the corresponding apparatus. The multiplex information acquiring unit 171 derives an interference coefficient $B_{ij}$ employed when all the base stations apply the precoding vector $V_i$ to the transmission signals as other station multiplex information. The other station multiplex information is information indicating how, if a precoding vector fed back by the mobile station apparatus #i is applied to a transmission signal in each base station apparatus #j, the signal transmitted from each base station apparatus #j is multiply received with respect to a signal to be received by the mobile station apparatus #i. Specifically, the multiplex information acquiring unit 171 derives $B_{ij}$ by Equation 11:

$$B_{ij} = \frac{V_i^+ H_{ii}^+ H_{ij} V_i}{V_i^+ H_{ii}^+ H_{ii} V_i} \quad (11)$$

Because the present embodiment is a system that controls adaptive modulation and a coding rate, CQI is fed back. The feedback information generating unit 17 derives the CQI.

The CQI may be derived by any method that has been conventionally developed. In the present embodiment, the feedback information generating unit 17 determines the CQI from a signal to noise interference ratio (SINR) calculated by Equation 12:

$$SINR = \frac{W_i^+ H_{ii}^+ H_{ii} W_i}{\sigma^2} \quad (12)$$

$\sigma^2$ represents interference noise power and is estimated from a received pilot signal. While there have been developed various methods for estimating interference noise power or the like from a received pilot signal, the method used herein is not particularly restricted. The interference noise may be estimated by calculating the average of pilot signals received at different frequencies at different times and using difference among the averages, for example.

The feedback information generating unit 17 stores therein in advance a value of CQI corresponding to each range of SINR expressed by Equation 12. The feedback information generating unit 17 determines the CQI corresponding to the SINR thus derived. The feedback information generating unit 17 stores therein TH(0), TH(1), . . . , TH(Ncqi−1) as a set value in advance. The feedback information generating unit 17 stores therein in advance correspondence relations as follows: if SINR<TH(0) is satisfied, CQI=0; if TH(n)≤SINR<TH(n+1) is satisfied, CQI=n; and if TH(Ncqi−1)<SINR is satisfied, CQI=Ncqi−1.

The feedback information generating unit 17 uses the precoding vector $V_i$ determined by the precoding determining unit 172, the interference coefficient $B_{ij}$ determined by the multiplex information acquiring unit 171, and the CQI thus derived to generate feedback information. Specifically, the feedback information generating unit 17 generates ($V_i$, $B_{i1}$, $B_{i2}$, . . . , $B_{ii-1}$, $B_{ii+1}$, . . . , $B_{iM}$, CQI) as the feedback information. In the present embodiment, to reduce the amount of information, $B_{ii}$ is excluded from the feedback information because $B_{ii}=1$ is satisfied in the interference coefficient $B_{id}$. In terms of the precoding vector $V_i$, an index corresponding to $V_i$ may be acquired from the table of precoding vectors illustrated in FIG. 5, and the index may be actually used as the feedback information of the precoding vector $V_i$. In this case, the feedback information described above is expressed by (index ($V_i$), $B_{i1}$, $B_{i2}$, . . . , $B_{ii-1}$, $B_{ii+1}$, . . . , $B_{iM}$, CQI) using index ($V_i$) as the index corresponding to $V_i$. While they are not particularly distinguished from each other and are denoted as the feedback information by simply using $V_i$ in the description of the embodiment below, a precoding vector can be replaced by an index in this manner in all the examples. Similarly, a plurality of candidate values of $B_{ij}$ may be stored in a table, and an index thereof may be used for the feedback information. In this case, because the accuracy in expression of $B_{ij}$ varies depending on the size of the table and the number of indexes, the amount of feedback information and the performance are in a trade-off relation. For this reason, the optimum table is not uniquely determined, and the detail thereof is determined by a designer of the system, for example. If it is not requested to reduce the amount of information so much, information including $B_{ii}$ may be used as the feedback information, or the precoding vector $V_i$ may be simply used for the feedback information. The feedback information generating unit 17 outputs the feedback information to the transmitting unit 16. Because the present embodiment is a system that controls adaptive modulation and the coding rate and that uses the CQI to determine a combination of the mobile station apparatuses #i, which will be described later, the feedback information includes the CQI. If a system does not control adaptive modulation or the coding rate and does not use CQI for the combination of the mobile station apparatuses #i, the feedback information may include no CQI.

The transmitting unit 16 receives the feedback information from the feedback information generating unit 17. The transmitting unit 16 then transmits the feedback information to the base station apparatus #1 via the transmitting antenna 19.

(Base Station Apparatus #1)

The base station apparatus #1 will now be described. FIG. 6 is a block diagram of the base station apparatus #1 according to the present embodiment. As illustrated in FIG. 6, the base station apparatus #1 includes the control unit 3, a data selecting unit 21, the symbol modulating unit 22, the VPT processing unit 23, a precoding unit 24, a signal transmitting unit 25, and the antenna 26.

The control unit 3 includes an allocation control unit 31 and a feedback information extracting unit 32. The allocation control unit 31 includes a notifying unit 311 and a combination determining unit 312.

Figure 7:
FIG. 7 is an exemplary schematic of an upstream link feedback information transmission format.

The feedback information extracting unit 32 acquires a signal including feedback information transmitted by the mobile station apparatus #i and received by the antenna 26. FIG. 7 is an exemplary schematic of an upstream link feedback information transmission format. The upstream link feedback information transmission format is a format of the signal including the feedback information transmitted by the mobile station apparatus #i. In other words, the feedback information extracting unit 32 receives the signal generated by using the format illustrated in FIG. 7. As illustrated in FIG. 7, the upstream link feedback information transmission format includes a pilot signal 501 and feedback information 502. The pilot signal 501 is used for receiving a phase shift of the transmission route, for example.

The feedback information extracting unit 32 extracts the feedback information from the signal thus received. The feedback information includes the precoding vector $V_i$ desired to be applied to the transmission signal to the corresponding apparatus specified by each mobile station apparatus #i and the interference coefficient $B_{ij}$ caused by signals transmitted from other base station apparatuses #j. Because the CQI is used to determine the mobile station apparatuses #i to which signals are to be transmitted in the present embodiment, which will be described later, the feedback information includes the CQI. If no CQI is used unlike the present embodiment, the feedback information may include no CQI.

The feedback information extracting unit 32 outputs the feedback information to the allocation control unit 31.

The allocation control unit 31 receives the feedback information from the feedback information extracting unit 32.

Figure 8:
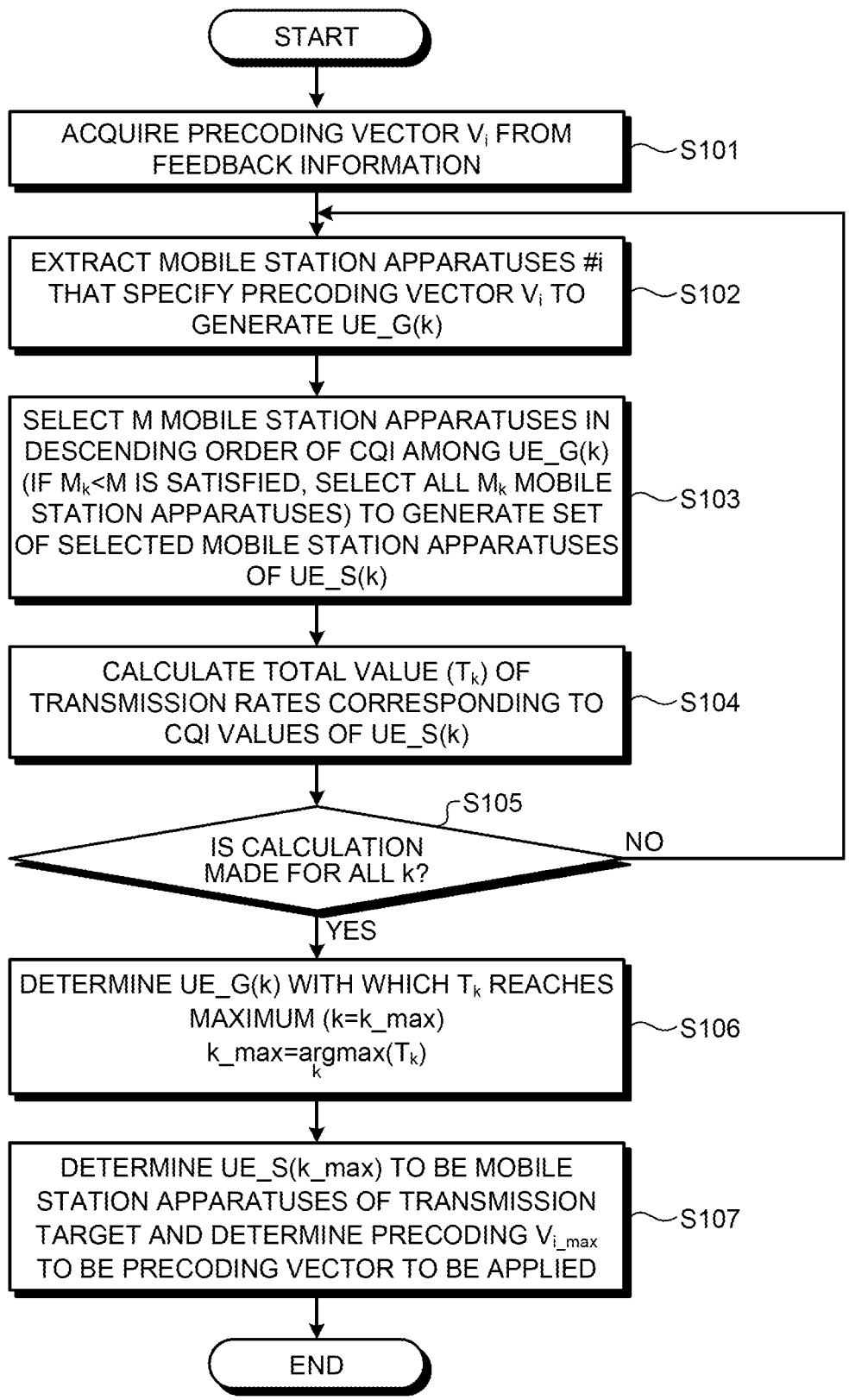
FIG. 8 is a flowchart of determination processing of a combination of mobile station apparatuses #i with which cooperative communications are to be established in the first embodiment.

The combination determining unit 312 determines a combination of the mobile station apparatuses #i to which signals are to be transmitted via the cooperative communications based on the feedback information transmitted from each mobile station apparatus #i. The method for determining the combination of the mobile station apparatuses #i in the present embodiment is not particularly restricted as long as the method selects a combination of mobile stations to which the same precoding vector can be applied. The determination of the combination of the mobile station apparatuses #i in the present embodiment will now be described with reference to FIG. 8. FIG. 8 is a flowchart of determination processing of the combination of the mobile station apparatuses #i with which cooperative communications are to be established in the first embodiment. In the flowchart of FIG. 8, UE_G(k) represents a set of the mobile station apparatuses #i that feed back the precoding $V_i$ corresponding to an index k as the precoding vector desired to be applied. $M_k$ represents the number of mobile station apparatuses included in UE_G(k).

The combination determining unit 312 acquires the precoding vector $V_i$ included in the feedback information received from each mobile station apparatus #i (Step S101). The index corresponding to $V_i$ is denoted as index ($V_i$).

The combination determining unit 312 extracts mobile station apparatuses #i that specify the precoding vector $V_i$ desired to be applied and whose precoding index of index ($V_i$) is k for each precoding vector $V_i$, thereby generating UE_G(k) (Step S102).

The combination determining unit 312 then selects M mobile station apparatuses in descending order of CQI among the mobile station apparatuses extracted as UE_G(k). If $M_k<M$ is satisfied, the combination determining unit 312 selects all $M_k$ mobile station apparatuses. The combination determining unit 312 then generates a set of the mobile station apparatuses thus selected of UE_S(k) (Step S103). The combination determining unit 312 temporarily determines M mobile station apparatuses for each of all the precoding indexes k. The combination determining unit 312 determines that there is no candidate for k with no mobile station apparatus #i that specifies the precoding vector $V_i$ corresponding to the precoding index k as the precoding vector desired to be applied.

The combination determining unit 312 calculates the total value of transmission rates in transmission of a signal to each mobile station apparatus #i included in UE_S(k) from the base station apparatuses #1 to #M in each UE_S(k). The combination determining unit 312 determines the total value of the transmission rates in UE_S(k) thus calculated to be $T_k$ (Step S104).

The combination determining unit 312 determines whether the calculation is made for all k (Step S105). If there is k for which the calculation is yet to be made (No at Step S105), the system control is returned to Step S102. If the calculation is made for all k (Yes at Step S105), the combination determining unit 312 specifies UE_G(k) with which the total value ($T_k$) of the transmission rates reaches the maximum (Step S106). In the description below, UE_G (k) with which $T_k$ reaches the maximum is denoted as UE_G(k_max).

The combination determining unit 312 determines the combination of the mobile station apparatuses #i of UE_S (k_max) to be the combination of the mobile station apparatuses #i to which signals are to be transmitted via the cooperative communications. The precoding applied to transmission of the signals to the mobile station apparatuses #i of UE_S(k_max) is determined to be a precoding vector $V_{i\_max}$ corresponding to an index k_max (Step S107). The determination processing is then terminated.

While the combination of the mobile station apparatuses #i is selected so as to raise the transmission rate as high as possible in the present embodiment, the combination may be selected by another method as described above. The combination of the mobile station apparatuses #i may be selected by: selecting a mobile station at random; determining an index corresponding to precoding fed back by the mobile station thus selected to be the index k_max; and selecting mobile stations from UE_G(k_max) at random to generate UE_S(k_max). In this case, no CQI information needs to be used.

The notifying unit 311 acquires the combination of the mobile station apparatuses #i with which the cooperative communications are to be established and the feedback information transmitted from the mobile station apparatuses #i included in the combination from the combination determining unit 312. The notifying unit 311 notifies the base station apparatuses #2 to #M of the combination of the mobile station apparatuses #i with which the cooperative communications are to be established and the feedback information transmitted from the mobile station apparatuses #i included in the combination.

The allocation control unit 31 outputs the combination of the mobile station apparatuses #i with which the cooperative communications are to be established determined by the combination determining unit 312 and the feedback information transmitted from the mobile station apparatuses #i included in the combination to the data selecting unit 21, the VPT processing unit 23, the precoding unit 24, and the signal transmitting unit 25.

The data selecting unit 21 receives signals from an external device, such as a source server. The signals received by the data selecting unit 21 include a signal to be transmitted to each mobile station apparatus #i. The data selecting unit 21 receives the combination of the mobile station apparatuses #i with which the cooperative communications are to be established from the allocation control unit 31. The data selecting unit 21 selects a signal to be transmitted to the mobile station apparatuses #i included in the combination with which the cooperative communications are to be established from the signals received from the external device and outputs the signal to the symbol modulating unit 22.

The symbol modulating unit 22 receives the signal to be transmitted to the mobile station apparatuses #i included in the combination with which the cooperative communications are to be established from the data selecting unit 21. The symbol modulating unit 22 modulates the signal thus received. In the present embodiment, the symbol modulating unit 22 employs any one of QPSK, 16QAM, and 64QAM as the modulation method. The symbol modulating unit 22 then outputs the signal thus modulated to the VPT processing unit 23. The signal modulated by the symbol modulating unit 22 is represented by the vector u composed of the transmission symbol $u_i$ generated by the modulation.

The VPT processing unit 23 receives the signal thus modulated from the symbol modulating unit 22. The VPT processing unit 23 receives the combination of the mobile station apparatuses #i with which the cooperative communications are to be established and the feedback information transmitted from the mobile station apparatuses #i included in the combination from the allocation control unit 31.

The VPT processing unit 23 acquires the interference coefficient $B_{ij}$ caused by a signal transmitted from each base station apparatus #j in the mobile station apparatuses #i from the feedback information. The VPT processing unit 23 generates a matrix B having an ij component of the interference coefficient $B_{ij}$.

The VPT processing unit 23 derives the error signal vector v by Equation 13:

$$v = \arg\min_L | B^{-1}(u+L) |^2 \qquad (13)$$

L represents a vector composed of $L_i=X(n_i+jm_i)$. $v$ takes L that minimizes $|B^{-1}(u+L)|^2$. The minimization is performed such that $n_i$ and $m_i$ in $L_i=X(n_i+jm_i)$ fall within $-X \le n_i$ and $m_i \le X$, respectively, for example. X is an arbitrary parameter and has the following trade-off: making X smaller decreases the amount of processing for searching for the minimum value; whereas making X smaller increases the frequency of errors, such as an optimum solution outside of the search range resulting in performance degradation. For this reason, X is preferably set in consideration of a capacity requested for the system in designing the system. Typically, X is not set to such a large value and simply is to be set to a value of a certain magnitude. This is because $|B^{-1}(u+L)|^2$ is a quadric surface having a minimum value of 0 when $u+L=0$ is satisfied in the whole range of complex numbers. Generally, as L increases, the value tends to increase. Thus, large L is highly unlikely to be a solution.

The VPT processing unit 23 uses the error signal vector thus derived to generate a transmission signal represented by x in Equation 14:

$$x=B^{-1}(u+v) \quad (14)$$

The VPT processing unit 23 outputs the transmission signal thus generated to the precoding unit 24.

The precoding unit 24 receives the transmission signal from the VPT processing unit 23. The precoding unit 24 receives information of the precoding vector specified by the mobile station apparatuses #i to which the signal is to be transmitted via the cooperative communications from the allocation control unit 31. In the present embodiment, the precoding unit 24 stores therein the table of precoding vectors illustrated in FIG. 5. This enables the precoding unit 24 to specify the precoding vector corresponding to the index of the precoding vector included in the feedback information.

The precoding unit 24 uses the precoding vector $V_i$ for the transmission signal to generate a transmission signal to which the precoding is applied. The precoding unit 24 then outputs the transmission signal thus generated to the signal transmitting unit 25.

The signal transmitting unit 25 receives the transmission signal from the precoding unit 24. The signal transmitting unit 25 receives the combination of the mobile station apparatuses #i with which the cooperative communications are to be established from the allocation control unit 31. The signal transmitting unit 25 then transmits the transmission signal to the mobile station apparatuses #i included in the combination thus received.

Figure 9:
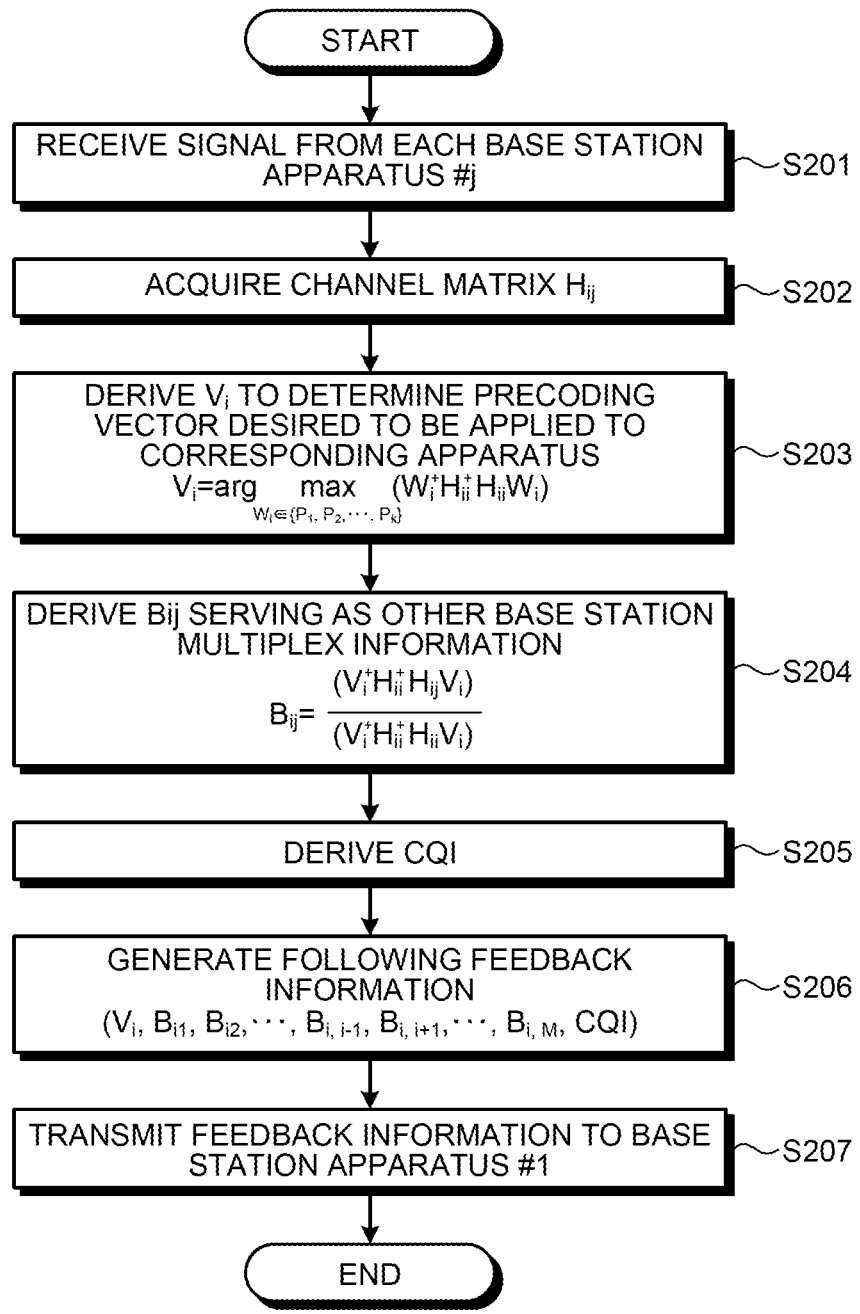
FIG. 9 is a flowchart of creation and feedback processing of feedback information in the mobile station apparatus.

The creation and feedback processing of the feedback information in the mobile station apparatus will now be described with reference to FIG. 9. FIG. 9 is a flowchart of the creation and feedback processing of the feedback information in the mobile station apparatus.

The mobile station apparatus #i acquires a signal transmitted from the base station apparatus #j (Step S201).

The channel estimating unit 15 acquires a pilot signal included in the signal transmitted from the base station apparatus #j to estimate a transmission route coefficient from each base station apparatus #j. In the present embodiment, the channel estimating unit 15 derives the transmission route coefficient as $H_{ij}$ ($1 \le i \le N$, $j \le MM$), which is an Nr×Nt matrix (Step S202).

The precoding determining unit 172 determines $V_i$ satisfying Equation 10 as the precoding vector $V_i$ desired to be applied (Step S203).

The multiplex information acquiring unit 171 receives the precoding vector $V_i$ determined by the precoding determining unit 172. The multiplex information acquiring unit 171 then derives the interference coefficient $B_{ij}$ employed when all the base stations apply the precoding vector $V_i$ to the transmission signals as the other station multiplex information by Equation (Step S204).

The feedback information generating unit 17 derives the CQI (Step S205).

The feedback information generating unit 17 uses the precoding vector $V_i$ determined by the precoding determining unit 172, the interference coefficient $B_{ij}$ determined by the multiplex information acquiring unit 171, and the CQI thus derived to generate feedback information. Specifically, the feedback information generating unit 17 generates ($V_i$, $B_{i1}$, $B_{i2}$, ..., $B_{i,i-1}$, $B_{i,i+1}$, ..., $B_{i,M}$, CQI) as the feedback information (Step S206).

The transmitting unit 16 transmits the feedback information generated by the feedback information generating unit 17 to the base station apparatus #1 (Step S207).

While the CQI is derived to determine the combination of the mobile station apparatuses #i using the CQI in the present embodiment, a system using no CQI in the base station apparatuses #j need not derive the CQI. In this case, Step S105 in the flowchart of FIG. 8 need not be performed. In this case, the feedback information generated by the feedback information generating unit 17 is ($V_i$, $B_{i1}$, $B_{i2}$, ..., $B_{ii-1}$, $B_{ii+1}$, ..., $B_{iM}$).

Figure 10:
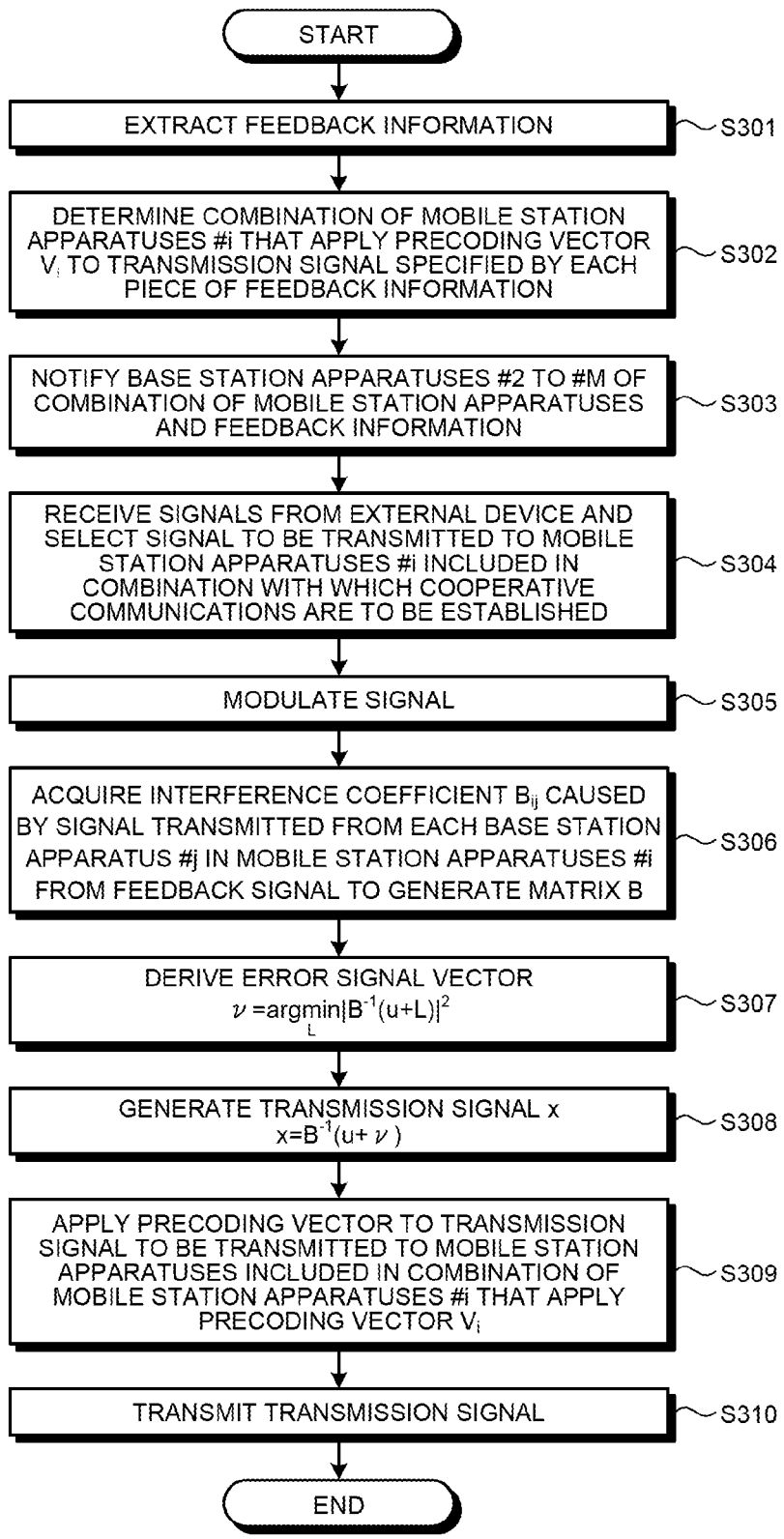
FIG. 10 is a flowchart of creation and transmission processing of a transmission signal based on the feedback information in the base station apparatus #1.

The creation and transmission processing of the transmission signal based on the feedback information in the base station apparatus #1 will now be described with reference to FIG. 10. FIG. 10 is a flowchart of the creation and transmission processing of the transmission signal based on the feedback information in the base station apparatus #1.

The feedback information extracting unit 32 extracts feedback information from a signal received from each mobile station apparatus #i (Step S301).

The combination determining unit 312 determines a combination of mobile station apparatuses #i that apply the precoding vector $V_i$ to the transmission signal specified by the feedback information (Step S302). An example of the processing at Step S302 corresponds to the processing illustrated in the flowchart of FIG. 8.

The notifying unit 311 notifies the base station apparatuses #2 to #M of the combination of the mobile station apparatuses #i determined by the combination determining unit 312 and the feedback information (Step S303).

The data selecting unit 21 receives signals from the external device. The data selecting unit 21 then selects a signal to be transmitted to the mobile station apparatuses #i included in the combination with which cooperative communications are to be established (Step S304).

The symbol modulating unit 22 modulates the signal selected by the data selecting unit 21 (Step S305).

The VPT processing unit 23 acquires the interference coefficient $B_{ij}$ caused by a signal transmitted from each base station apparatus #j in the mobile station apparatuses #i from the feedback information. The VPT processing unit 23 generates the matrix B having an ij component of the interference coefficient $B_{ij}$ (Step S306).

The VPT processing unit 23 derives the error signal vector v by Equation 13 (Step S307).

The VPT processing unit 23 uses the error signal vector thus derived to generate the transmission signal represented by x in Equation 14 (Step S308).

The precoding unit 24 applies the precoding vector $V_i$ to the transmission signal to be transmitted to the mobile station apparatuses #i included in the combination of the mobile station apparatuses #i that apply the precoding vector $V_i$ (Step S309).

The signal transmitting unit 25 transmits the transmission signal to each mobile station apparatus #i included in the combination with which the cooperative communications are to be established (Step S310).

The explanation has been made of the processing performed in the base station apparatuses #1 in the flowchart of FIG. 10. The base station apparatuses #2 to #M also use the combination of the mobile station apparatuses and the feedback information transmitted from the base station apparatus #1 at Step S303 to perform the creation and transmission processing of the transmission signal at Step S304 to Step S310.

As described above, the mobile communication system according to the present embodiment combines the mobile station apparatuses that can apply the same precoding vector to the transmission signals based on the precoding vectors desired by the mobile station apparatuses as destinations of signals in the cooperative communications.

Because the precoding is performed based on the information of the precoding desired by the mobile station apparatuses, it is possible to save transmission of the information of the precoding to be applied from the base station apparatuses to the mobile station apparatuses. This makes it possible to reduce the amount of information of a control signal included in the signals transmitted from the base station apparatuses to the mobile station apparatuses. Furthermore, because the base station apparatuses use the same precoding, it is possible to collectively determine the precoding to be applied to the transmission signals transmitted to the respective mobile station apparatuses. Thus, the mobile station apparatuses need not feed back the information of the precoding to be applied to the base station apparatuses from the mobile station apparatuses. This makes it possible to reduce the amount of information to be fed back from the mobile station apparatuses to the base station apparatuses.

Examples of the conventional method for orthogonalizing the mobile station apparatuses by using the precoding include the following methods: a method for ideally feeding back a channel state (H) itself; and a method for feeding back precoding $V_1$ desired to be applied in a specific base station apparatus and precoding $V_2$ desired to be applied in another base station apparatus as the precoding. The amount of information to be fed back is evaluated focusing on the number of complex variables for ease of explanation. An assumption is made that a system includes Nr×Nt antennas and N base stations for the evaluation. In this case, to feed back the channel state (H) itself, Nr×Nt×N pieces of information are used. To feed back the precoding $V_1$ and $V_2$, (Nt−1)×N pieces of information are used. By contrast, only (Nt−1)+N pieces of information are used in the mobile communication system according to the present embodiment.

An explanation will be made using a specific example. In a cell placement model, such as a 19-cell model, the number of cells adjacent to a cell edge is up to three. In a $3^{rd}$ generation partnership project long term evolution (3GPPLTE) system, the number of transmitting antennas is assumed to be up to four, and the number of receiving antennas is assumed to be two to four. Assuming that N=3, Nt=4, and Nr=4, the amount of information in feeding back of H is 4×4×3×2=96, and the amount of information in feeding back of the precoding $V_1$ and $V_2$ is (8−2)×3=18. By contrast, the amount of information is (8−2)+(2×3)=12 in the communication system according to the present embodiment. As described above, the amount of information fed back in the communication system according to the present embodiment is reduced compared with the conventional methods.

If the precoding applied in the base station apparatuses varies, mobile station apparatuses that feed back a combination of the same precoding are combined in the determination processing of a combination of the mobile station apparatuses serving as the destinations. In this case, because there are a lot of combinations of the precoding, it is less likely that the mobile station apparatuses have a combination of the same precoding to be applied in the base station apparatuses. This makes it difficult to determine a combination of the mobile station apparatuses serving as the destinations of signals and not interfering with one another. An assumption is made that cooperative communications are established in a system having K types of precoding with two base station apparatuses, for example. In this case, if different precoding is applied in the respective base station apparatuses, there are $K^2$ combinations of the precoding to be applied in the base station apparatuses. If the combinations of the precoding are created at random, the probability of mobile station apparatuses that feed back a combination of the same precoding is $1/K^2$. If it is highly likely that no appropriate combination of the mobile station apparatuses can be determined in cooperative communications as described above, communications may possibly be established with a combination of the mobile station apparatuses that is not most appropriate, for example. This may possibly deteriorate throughput.

In the present embodiment, if feedback is carried out on the assumption that the same precoding is applied in all the base station apparatuses, the probability of mobile station apparatuses that feed back the same precoding corresponds to the number of types of the precoding. If there are K types of precoding, for example, the probability of mobile station apparatuses that feed back the same precoding is 1/K.

In the case of K=16, for example, a system that may possibly use different precoding in the respective base station apparatuses has a probability of 1/256 of mobile station apparatuses that feed back a combination of the same precoding. By contrast, the mobile communication system according to the present embodiment has a probability of 1/16.

The mobile communication system according to the present embodiment can readily create a combination of the mobile station apparatuses with which the cooperative communications are to be established compared with a system that may possibly use different precoding in the respective base station apparatuses. Thus, the mobile communication system can select an appropriate combination of the mobile station apparatuses in cooperative communications to perform the communications with a more appropriate combination of mobile station communications.

The mobile communication system according to the present embodiment is based on the assumption that a plurality of base station apparatuses cooperate to transmit signals. By contrast, it is difficult to apply the system such as the present embodiment to a system that multiplexes signals to be transmitted to a plurality of mobile station apparatuses using the same antenna of the same base station apparatus. In the present embodiment, the interference signal $B_{ij}$ is fed back from the mobile station apparatuses to the base station apparatuses, and the base station apparatuses derive an error signal L to generate a transmission signal of $x=B^{-1}(u+L)$. In terms of this, to transmit the signals from the same antenna of the same base station apparatus, $H_{ij}=H_{ij}$ is satisfied. In this case, $B_{ij}=1$ is satisfied. In other words, the matrix B satisfies detB=0, whereby no inverse matrix $B^{-1}$ is present. Thus, it is difficult to apply the mobile communication system according to the present embodiment to the case where the signals are transmitted from the same antenna of the same base station apparatus. By contrast, signals transmitted from antennas arranged at spatially different positions are generally considered to have different transmission routes ($H_{1j}\neq H_{ii}$). Thus, the mobile communication system according to the present embodiment can be applied to transmission of signals via the cooperative communications performed by a plurality of base station apparatuses.

Second Embodiment

A mobile communication system according to a second embodiment will now be described. The mobile communication system according to the second embodiment is different from the first embodiment in that base station apparatuses including different numbers of antennas coexist. Functional blocks of a mobile station apparatus and a base station apparatus according to the present embodiment are the same as those in the first embodiment and are illustrated in FIG. 3 and FIG. 6, respectively. An explanation will be made of the mobile communication system supporting one, two, and four antennas in the present embodiment.

A precoding vector is a vector of dimensions of the number of antennas included in the base station apparatus. If base stations including different numbers of antennas coexist, the precoding vector corresponding to each number of antennas is determined. FIG. 11 is an exemplary schematic of a table of precoding vectors in the second embodiment. The mobile communication system according to the present embodiment uses the table illustrated in FIG. 11. In FIG. 11, Pk(n) (k=1, 2, 4, n=1 to K) represents precoding corresponding to an index n applied by a base station including k antennas. An index 1, for example, is associated with precoding vector P1(1) employed when the number of antennas is one, precoding vector P2(1) employed when the number of antennas is two, and precoding vector P4(1) employed when the number of antennas is four. In this case, Pk(n) is a vector having a k component.

A precoding determining unit 172 in a mobile station apparatus #i according to the present embodiment stores therein the table of precoding vectors illustrated in FIG. 11. The precoding determining unit 172 determines a precoding vector to be applied to a transmission signal to be transmitted to the corresponding apparatus from a combination of the precoding vectors. The precoding vector, for example, may be determined so as to maximize received-signal power from a specific base station apparatus in the same manner as in the first embodiment. Specifically, if the specific base station apparatus includes two antennas, the precoding determining unit 272 of the base station apparatus derives a precoding vector $V_i$ satisfying Equation 9 from the precoding vectors: $W_i(2)$ in FIG. 11.

A multiplex information acquiring unit 171 stores therein the table of precoding vectors illustrated in FIG. 11. The multiplex information acquiring unit 171 acquires precoding vectors of the other numbers of antennas corresponding to the index of the precoding vector thus received from the table of precoding vectors. The multiplex information acquiring unit 171 then uses the precoding vector corresponding to the number of antennas of a base station apparatus #j to derive an interference coefficient $B_{ij}$.

A feedback information generating unit 17 uses the index of the precoding vector to be applied and the interference coefficient $B_{ij}$ derived by the multiplex information acquiring unit 171 to generate feedback information.

An allocation control unit 31 acquires feedback information output by each mobile station apparatus #i from a feedback information extracting unit 32.

A combination determining unit 312 extracts mobile station apparatuses #i having the same index of the precoding vector included in the feedback information thus acquired and determines a combination of mobile station apparatuses #i with which cooperative communications are to be established among them.

A VPT processing unit 23 generates a signal $x=B^{-1}(u+v)$ from the interference coefficient $B_{ij}$ received from the allocation control unit 31.

A precoding unit 24 stores therein the table of precoding vectors illustrated in FIG. 11. The precoding unit 24 acquires, from the table, a precoding vector corresponding to the number of antennas of the corresponding apparatus corresponding to the index of the precoding vector received from the allocation control unit 31. The precoding unit 24 then applies the precoding vector thus acquired to the signal x received from the VPT processing unit 23.

As described above, in the mobile communication system according to the present embodiment in which base station apparatuses including different numbers of antennas coexist, base station apparatuses including the same number of antennas determine a combination of mobile station apparatuses that require application of the same precoding vector to be a target to which signals are to be transmitted via cooperative communications. This makes it possible to reduce the amount of information fed back from the mobile station apparatuses to the base station apparatuses even if base station apparatuses including different numbers of antennas coexist. It is also possible to facilitate specifying an appropriate combination of mobile station apparatuses in the cooperative communications even if base station apparatuses including different numbers of antennas coexist.

Figure 12:
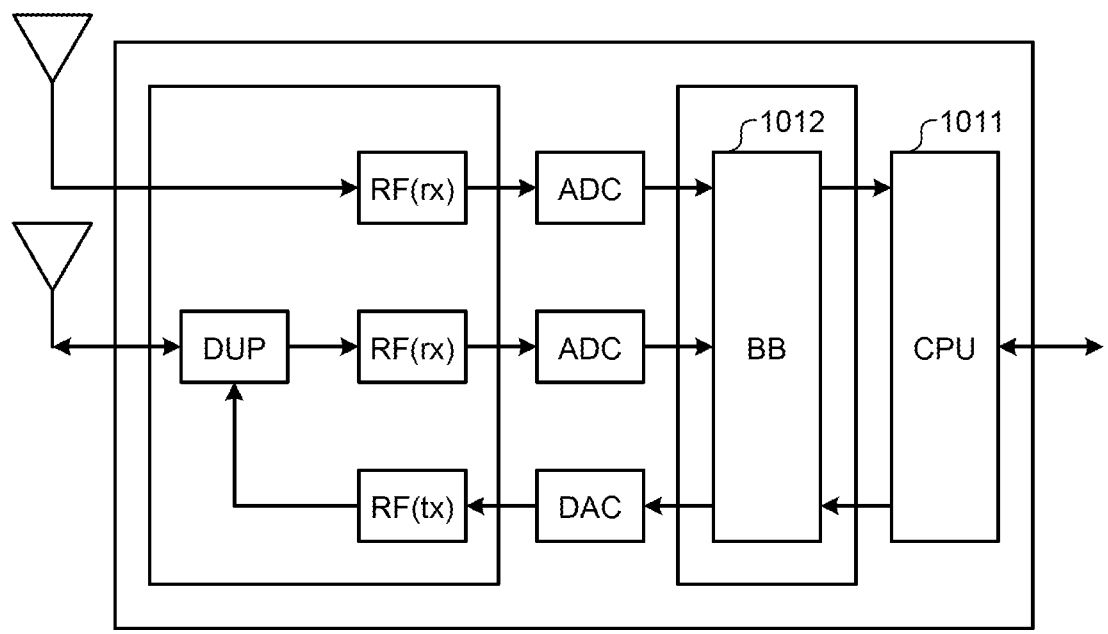
FIG. 12 is a schematic of a hardware configuration of the mobile station apparatus.

FIG. 12 is a schematic of a hardware configuration of the mobile station apparatus. A DUP represents a duplexer. An analog-digital converter (ADC) performs analog-digital conversion. A digital-analog converter (DAC) performs digital-analog conversion. A radio frequency (RF) (transmitter (tx)) controls transmission of a radio signal. An RF (receiver (rx)) controls reception of a radio signal. The DUP, the RF(tx), the RF(rx) are mainly formed of an analog circuit. A central processing unit (CPU) 1011 performs communication control and communication processing in a higher-level layer. A base band (BB) 1012 is mainly formed of a digital circuit and a digital signal processor (DSP) or a CPU. The units illustrated in FIG. 3 are provided by the BB 1012.

Figure 13:
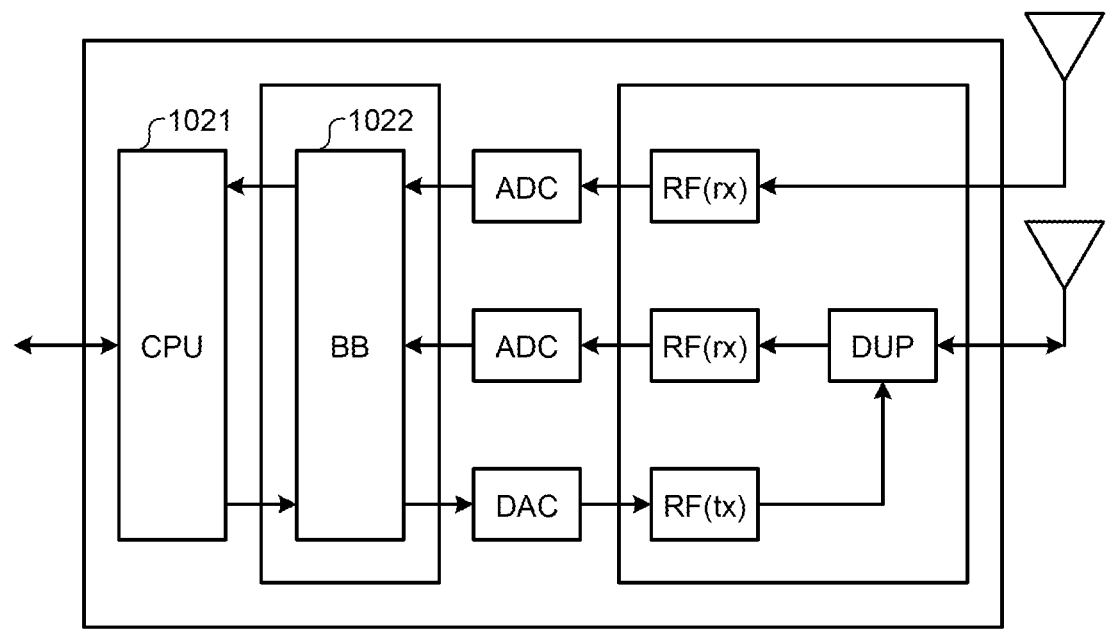
FIG. 13 is a schematic of a hardware configuration of the base station apparatus #1.

FIG. 13 is a schematic of a hardware configuration of the base station apparatus #1. Similarly to FIG. 12, a DUP represents a duplexer. An ADC performs analog-digital conversion. A DAC performs digital-analog conversion. An RF(tx) controls transmission of a radio signal. An RF(rx) controls reception of a radio signal. The DUP, the RF(tx), and the RF(rx) are mainly formed of an analog circuit. A CPU 1021 performs communication control and communication processing in a higher-level layer. A base band (BB) 1022 is mainly formed of a digital circuit and a DSP or a CPU. The units illustrated in FIG. 6 are provided by the BB 1022.

An aspect of a mobile communication system, a base station apparatus, and a communication control method disclosed in the present application can reduce deterioration of signals due to mutual interference, the amount of information of feedback information, and consumption of wireless resource in cooperative communications in which a plurality of base stations transmit data to a plurality of mobile stations.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile communication system comprising:
    one or more base station apparatuses;
    a plurality of mobile station apparatuses that communicate with the one or more base station apparatuses; and
    a signal transmission control device, wherein
    the plurality mobile station apparatuses each comprise:
        a precoding determining unit that determines applied precoding to be applied to a transmission signal from the base station apparatuses to a corresponding mobile station apparatus;
        a multiplex information acquiring unit that acquires other base station multiplex information indicating how, when a second base station apparatus transmits a signal to which the applied precoding is applied, a signal transmitted from a certain base station apparatus and the signal transmitted from the second base station apparatus are multiply received based on the signal received from the certain base station apparatus; and
        a first transmitting unit that transmits information of the applied precoding to the base station apparatuses and the signal transmission control device and transmits feedback information including the information of the applied precoding and the other base station multiplex information to the certain base station apparatus and the second base station apparatus,
    the base station apparatuses each comprise a second transmitting unit that applies same precoding and transmits a transmission signal to a plurality of mobile station apparatuses that specify the same precoding as the applied precoding, and
    the signal transmission control device comprises:
        a combination determining unit that determines a combination of mobile station apparatuses with which cooperative communications are to be established among the mobile station apparatuses that specify the same precoding as the applied precoding in the feedback information; and
        a combination notifying unit that notifies the certain base station apparatus and the second base station apparatus of the combination of the mobile station apparatuses.

2. The mobile communication system according to claim 1, wherein
    the base station apparatuses each comprise:
        a signal generating unit that acquires error signal information for each of the mobile station apparatuses based on the feedback information received from each of the mobile station apparatuses and generates a transmission signal for each of the mobile station apparatuses based on the other base station multiplex information included in the feedback information and on the error signal information;
        a precoding unit that applies the applied precoding specified by the feedback information to the transmission signal; and
        a signal transmitting unit that multiplexes the transmission signal to which the applied precoding is applied for each combination of the mobile station apparatuses and transmits a resultant transmission signal to each of the mobile station apparatuses.

3. The mobile communication system according to claim 2, wherein
    the precoding unit stores therein in advance the precoding provided in plurality and selects to apply precoding to be applied to the transmission signal from the precoding thus stored, and
    the precoding determining unit stores therein in advance the precoding that is provided in plurality and is the same as that stored in the precoding unit and determines the applied precoding from the precoding thus stored.

4. The mobile communication system according to claim 3, wherein
    the base station apparatuses each comprise a plurality of antennas for outputting a transmission signal, and
    the precoding determining unit stores therein a combination of the precoding considered to be the same precoding among the precoding corresponding to number of a plurality of antennas.

5. The mobile communication system according to claim 1, wherein the multiplex information acquiring unit derives an interference coefficient matrix serving as the other base station multiplex information by:

$$B_{ij} = \frac{W^+ H_{ii}^+ H_{ij} W}{W^+ H_{ii}^+ H_{ii} W}$$

where the applied precoding is denoted as W, a transmission route matrix from a main base station apparatus i in cooperative communications established with a specific mobile station apparatus is denoted as Hii, and a transmission route matrix from a second base station apparatus j that performs cooperative communications with the specific mobile station apparatus is denoted as Hij.

6. A base station apparatus comprising:
    a combination determining unit that determines a combination of mobile station apparatuses with which cooperative communications are to be established among mobile station apparatuses that specify application of same precoding; and
    a combination notifying unit that notifies a second base station apparatus of the combination of the mobile station apparatuses;
    a signal generating unit that acquires error signal information for each of the mobile station apparatuses based on information of precoding specified to be applied by each of the mobile station apparatuses and generates a transmission signal for each of the mobile station apparatuses based on the error signal information and other base station multiplex information received from each of the mobile station apparatuses;

a precoding unit that applies the precoding specified by each of the mobile station apparatuses to the transmission signal, as applying same precoding and transmitting a transmission signal to a plurality of mobile station apparatuses that specify the same precoding as the applied precoding; and a signal transmitting unit that multiplexes the transmission signal to which the precoding is applied for each combination of the mobile station apparatuses and transmits a resultant transmission signal to each of the mobile station apparatuses, wherein the plurality mobile station apparatuses each including a precoding determining unit that determines applied precoding to be applied to the transmission signal from the base station apparatuses to a corresponding mobile station apparatus;

a multiplex information acquiring unit that acquires other base station multiplex information indicating how, when the second base station apparatus transmits the signal to which the applied precoding is applied, a signal transmitted from a certain base station apparatus and the signal transmitted from the second base station apparatus are multiply received based on the signal received from the certain base station apparatus; and a first transmitting unit that transmits information of the applied precoding to the base station apparatuses and the combination determining unit and transmits feedback information including the information of the applied precoding and the other base station multiplex information to the certain base station apparatus and the second base station apparatus.

7. A communication method used by a communication system including one or more base station apparatuses, a plurality of mobile station apparatuses that communicate with the base station apparatuses, and a signal transmission control device, the communication method causing the mobile station apparatuses to perform:

determining applied precoding to be applied to a transmission signal from the base station apparatuses to the mobile station apparatuses;

acquiring other base station multiplex information indicating how, when a second base station apparatus transmits a signal to which the applied precoding is applied, a signal transmitted from a certain base station apparatus and the signal transmitted from the second base station apparatus are multiply received based on the signal received from the certain base station apparatus; and transmitting information of the applied precoding thus determined from the mobile station apparatuses to the base station apparatuses and the signal transmission control device and transmits feedback information including the information of the applied precoding and the other base station multiplex information to the certain base station apparatus and the second base station apparatus, the communication method causing the base station apparatuses to perform:

applying same precoding and transmits a transmission signal to a plurality of mobile station apparatuses that specify the same precoding as the applied precoding, and the communication method causing the signal transmission control device to perform:

determining a combination of mobile station apparatuses with which cooperative communications are to be established among the mobile station apparatuses that specify the same precoding as the applied precoding in the feedback information; and notifying the certain base station apparatus and the second base station apparatus of the combination of the mobile station apparatuses.

* * * * *